United States Patent
Buchbinder et al.

(10) Patent No.: US 9,328,296 B2
(45) Date of Patent: May 3, 2016

(54) METHOD FOR RECOVERING ENTRAINED IONIC LIQUID FROM AN IONIC LIQUID IMMISCIBLE PHASE

(71) Applicant: UOP LLC, Des Plaines, IL (US)

(72) Inventors: Avram M. Buchbinder, Chicago, IL (US); Susie C. Martins, Carol Stream, IL (US); Sean Glennon Thomas Mueller, Des Plaines, IL (US); Kurt Detrick, Glen Ellyn, IL (US); Zhanping Xu, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 288 days.

(21) Appl. No.: 14/229,462

(22) Filed: Mar. 28, 2014

(65) Prior Publication Data

US 2015/0274614 A1 Oct. 1, 2015

(51) Int. Cl.
*C10G 29/20* (2006.01)
*B01D 17/04* (2006.01)

(52) U.S. Cl.
CPC ............ *C10G 29/205* (2013.01); *B01D 17/047* (2013.01); *C10G 2300/70* (2013.01)

(58) Field of Classification Search
None
See application file for complete search history.

(56) References Cited

U.S. PATENT DOCUMENTS

| | | | |
|---|---|---|---|
| 4,764,440 A | 8/1988 | Jones et al. | |
| 5,104,840 A | 4/1992 | Chauvin et al. | |
| 5,824,832 A | 10/1998 | Sherif et al. | |
| 6,531,273 B1 * | 3/2003 | Olson | ................ G03C 1/49845 252/363.5 |
| 7,956,230 B2 | 6/2011 | Timken et al. | |
| 8,067,656 B2 | 11/2011 | Luo et al. | |
| 8,597,517 B2 | 12/2013 | Guzman Lucero et al. | |
| 8,603,326 B2 | 12/2013 | Painter et al. | |
| 2010/0130800 A1 | 5/2010 | Luo et al. | |
| 2012/0165590 A1 | 6/2012 | Liu et al. | |
| 2013/0066130 A1 | 3/2013 | Luo et al. | |
| 2013/0211175 A1 | 8/2013 | Timken et al. | |
| 2013/0345484 A1 | 12/2013 | Martins et al. | |

FOREIGN PATENT DOCUMENTS

| | | |
|---|---|---|
| EP | 1854786 A1 | 11/2007 |
| WO | WO 03/020843 A1 | 3/2003 |

* cited by examiner

*Primary Examiner* — Tam M Nguyen

(57) ABSTRACT

A method for recovering entrained ionic liquid from an immiscible phase containing droplets of ionic liquid is described. The method includes contacting the immiscible phase containing the droplets of ionic liquid with a scrubbing ionic liquid phase in a scrubbing zone. The immiscible phase containing the droplets of ionic liquid has a first level of droplets of ionic liquid. At least a portion of the droplets of ionic liquid are transferred to the scrubbing ionic liquid phase to form a recovered ionic liquid phase comprising the scrubbing ionic liquid and the transferred portion of the droplets of ionic liquid and a second immiscible phase having a second level of droplets of ionic liquid lower than the first level. The second immiscible phase is separated from the recovered ionic liquid phase.

20 Claims, 2 Drawing Sheets

METHOD FOR RECOVERING ENTRAINED IONIC LIQUID FROM AN IONIC LIQUID IMMISCIBLE PHASE

BACKGROUND OF THE INVENTION

Ionic liquids are essentially salts in a liquid state, and are described in U.S. Pat. No. 4,764,440, U.S. Pat. No. 5,104,840, and U.S. Pat. No. 5,824,832. Ionic liquids typically melt below room temperature, and form liquid compositions at a temperature below the individual melting points of the constituents.

Ionic liquids have been used to catalyze a variety of hydrocarbon conversion processes, such as alkylation, isomerization, disproportionation, and the like. When ionic liquids are used to catalyze hydrocarbon conversion processes, the hydrocarbon feed and the ionic liquid catalyst are typically mixed with high shear to provide intimate contact. During the mixing, small droplets of ionic liquid become suspended in the immiscible phase, and some of these small droplets of ionic liquid remain entrained in the immiscible phase after conventional liquid-liquid phase separation by gravity. Because of the relatively high cost of ionic liquids, it is important to recover this entrained ionic liquid.

One method of recovering entrained ionic liquids is described in U.S. Pat. No. 8,067,656. The process involves adsorbing ionic liquid droplets onto a coalescing material, coalescing the small droplets into larger droplets on the surface of the material, and capturing the coalesced droplets by settling to provide an ionic liquid layer. However, this method requires the use of a coalescing material.

There is a need for additional methods of recovering entrained ionic liquids.

SUMMARY OF THE INVENTION

One aspect of the invention involves a method for recovering entrained ionic liquid from an ionic liquid immiscible phase containing droplets of ionic liquid. In one embodiment, the method includes contacting the immiscible phase containing the droplets of ionic liquid with a scrubbing ionic liquid phase in a scrubbing zone. The immiscible phase containing the droplets of ionic liquid has a first level of droplets of ionic liquid. At least a portion of the droplets of ionic liquid are transferred to the scrubbing ionic liquid phase to form a recovered ionic liquid phase comprising the scrubbing ionic liquid and the transferred portion of the droplets of ionic liquid and a second immiscible phase having a second level of droplets of ionic liquid lower than the first level. The second immiscible phase is separated from the recovered ionic liquid phase.

Another aspect of the invention involves a hydrocarbon conversion method. In one embodiment, the method includes contacting at least one hydrocarbon feed with an ionic liquid catalyst comprising at least one ionic liquid in a hydrocarbon conversion zone resulting in an ionic liquid phase and an hydrocarbon phase containing droplets of ionic liquid. The ionic liquid phase and the hydrocarbon phase containing the droplets of ionic liquid are separated. The hydrocarbon phase containing the droplets of ionic liquid is contacted with a scrubbing ionic liquid phase in a scrubbing zone, the hydrocarbon phase containing the droplets of ionic liquid having a first level of droplets of ionic liquid. At least a portion of the droplets of ionic liquid is transferred to the scrubbing ionic liquid phase to form a recovered ionic liquid phase comprising the scrubbing ionic liquid and the transferred portion of the droplets of ionic liquid and a second hydrocarbon phase having a second level of droplets of ionic liquid lower than the first level. The second hydrocarbon phase is separated from the recovered ionic liquid phase.

DETAILED DESCRIPTION OF THE INVENTION

Figure 1:
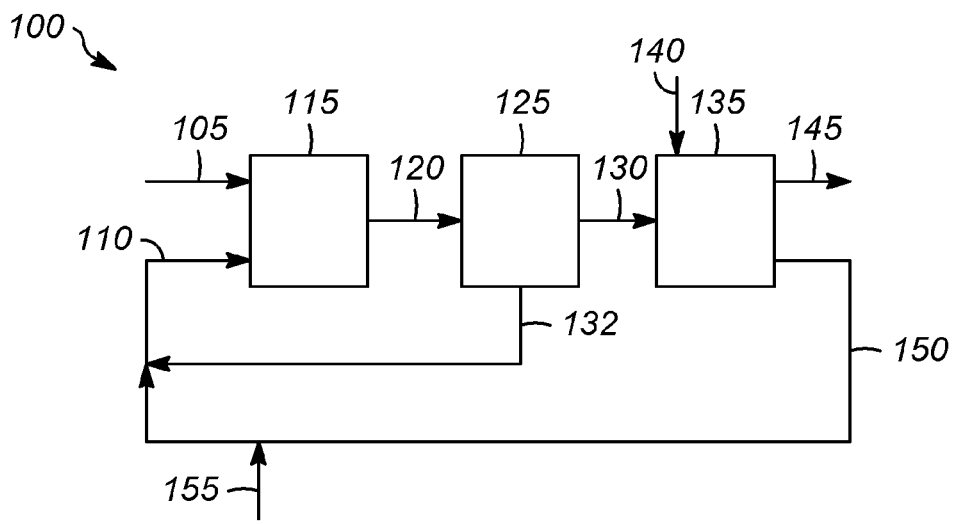
FIG. 1 illustrates one embodiment of a hydrocarbon conversion process utilizing the method for recovering entrained ionic liquid from an ionic liquid immiscible phase containing droplets of ionic liquid.

The present invention involves recovering the entrained ionic liquid droplets from an ionic liquid immiscible phase by mixing the immiscible phase with scrubbing ionic liquid phase. By contacting the immiscible phase containing the entrained droplets of ionic liquid with a scrubbing ionic liquid phase, the droplets of entrained ionic liquid combine with the surrounding scrubbing ionic liquid phase. In some embodiments, the present invention provides a method for removing the entrained ionic liquid droplets directly into the ionic liquid that is used in the process or a precursor of the process ionic liquid.

Moreover, it eliminates the need for a coalescing material, although coalescing materials can be used in some embodiments. There are several advantages in not using a coalescing material. First, the coalescing material can become fouled with ionic liquid and conjunct polymer. In addition, the use of coalescing material requires a pressure drop, and building up a pressure head expends power. Also, additional separation may be required when a coalescing material is used. By coalescing material, we mean materials which have a stronger attraction for the ionic liquid than for the hydrocarbons, and which have surface properties such that the materials can be fully wetted by the ionic liquid. They can be high specific surface area materials with voids or openings of a size approaching the size of the smallest droplets of ionic liquid to be removed. Examples of coalescing materials are glass beads, stainless steel metal packing, fiberglass, polymer fibers, and ceramic membrane.

Under some circumstances, trays and distributor plates in contacting vessels might be considered coalescing materials because they provide improved contact between the immiscible phase and the scrubbing ionic liquid phase; however, they are different from the materials mentioned above because they do not have high surface area. In addition, materials with voids or openings which are significantly larger than the smallest droplets to be removed can also be used.

This process can be used to remove ionic liquid entrained in an immiscible phase no matter where the stream comes from. For example, the raffinate from an extraction process utilizing an ionic liquid could include entrained ionic liquid. Another possibility is the solvent and excess reagent using in the ionic liquid synthesis. Another source could be the solvent excess regenerant and converted regenerant in an ionic liquid regeneration process. For ease of discussion, the process will be described for use in a hydrocarbon conversion process.

By ionic liquid immiscible phase, we mean a phase in which the ionic liquid is immiscible. By immiscible, we mean that a distinct phase is present aside from the phase containing the majority of the ionic liquid. While ionic liquid may be slightly soluble in the immiscible phase, a homogenous mixture between the two phases cannot be formed without input of mechanical force, and in the absence of such force the two phases at least partially separate after some time. The ionic liquid immiscible phase could be a hydrocarbon, an organic solvent, a reagent or solvent containing elements other than C and H, such as alcohols, ethers, ketones, esters, amides and the like, and supercritical media, such as supercritical carbon dioxide, a supercritical liquefied petroleum gas such as propane, or supercritical ethylene or propylene. Liquids or supercritical media which are immiscible with the ionic liquid immiscible phase will depend upon the identity of the ionic liquid.

The scrubbing ionic liquid phase can include one or more ionic liquids. It can also include one or more additives, such as solvent, surfactant, contaminants or nonionic precursors of ionic liquids, or combinations thereof. The additive, if present, preferably comprises less than half of the volume of the scrubbing ionic liquid, and is preferably easily separated from the ionic liquid by methods known to one skilled in the art or will not interfere with the ionic liquid of the process from which the droplets were generated.

One embodiment of a hydrocarbon conversion process 100 utilizing the present invention is illustrated in FIG. 1. A hydrocarbon feed 105 and an ionic liquid catalyst 110 comprising at least one ionic liquid are introduced into a reaction zone 115 for reaction. Various hydrocarbon conversion processes can occur in the reaction zone 115, including, but not limited to, alkylation, isomerization, and disproportionation. These reactions typically employ high shear mixing apparatus to provide intimate contact between the hydrocarbon feed 105 and the ionic liquid catalyst 110.

The reaction mixture 120 includes the hydrocarbon conversion products and the ionic liquid catalyst, and may contain solvent, unconverted reactant, or other materials. The reaction mixture is sent to separation zone 125 where the hydrocarbon conversion products separate from the ionic liquid catalyst forming an immiscible phase 130 and an ionic liquid phase 132. This separation can be a phase separation as a result of the difference in the density of the immiscible phase 130 and the ionic liquid phase 132, although other methods could also be used. The ionic liquid phase 132 can be recycled to the reaction zone 115, if desired.

Because of the high shear mixing, some small ionic liquid droplets remain in the immiscible phase 130. The immiscible phase 130 containing the entrained droplets of ionic liquid is sent to a scrubbing zone 135. The scrubbing zone 135 includes scrubbing ionic liquid phase 140. The immiscible phase 130 containing the droplets of ionic liquid is passed through the scrubbing ionic liquid phase 140. As it contacts the scrubbing ionic liquid phase 140, at least a portion of the droplets of ionic liquid in the immiscible phase 130 come into contact with the scrubbing ionic liquid phase 140 and are transferred to it. This results in an immiscible phase 145 exiting the scrubbing zone 135 which contains less ionic liquid than the incoming immiscible phase 130, and a recovered ionic liquid phase 150 which contains the scrubbing ionic liquid and the portion of ionic liquid droplets transferred from the immiscible phase 130.

Figure 2:
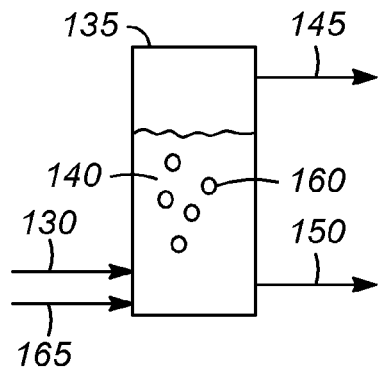
FIG. 2 illustrates one embodiment of a scrubbing zone.

Various configurations are possible for the scrubbing zone 135. For example, as illustrated in FIG. 2, the scrubbing zone 135 can comprise a vessel containing the scrubbing ionic liquid phase 140. The immiscible phase 130 is introduced at or near the bottom (e.g., within the bottom 10%) of the vessel through a sparger or dip tube. The immiscible phase 130 enters in the form of hydrocarbon droplets 160 which contain entrained micro-droplets of ionic liquid. The hydrocarbon droplets 160 rise through the scrubbing ionic liquid phase 140 due to their buoyancy relative to the scrubbing ionic liquid phase 140. During the migration to the top of the scrubbing ionic liquid phase 140, the micro-droplets of ionic liquid that are at or migrate to the phase boundary of the hydrocarbon droplets 160 combine with the scrubbing ionic liquid phase 140. Thus, the micro-droplets of ionic liquid are transferred from the hydrocarbon droplets 160 to the surrounding scrubbing ionic liquid phase 140 provided the micro-droplets migrate to the phase boundary of the hydrocarbon droplet on a shorter timescale than the contact time of the hydrocarbon droplet with the scrubbing ionic liquid.

After passing through the scrubbing ionic liquid, the hydrocarbon droplets 160 form an immiscible phase above the ionic liquid phase 140. The immiscible phase can be removed from the top or side of the scrubbing zone 135 as immiscible phase 145 and sent for downstream processing. The immiscible phase 145 which exits the scrubbing zone 135 has a lower level of ionic liquid droplets than the incoming immiscible phase 130. In some embodiments, the immiscible phase 145 can be sent to an additional scrubbing zone (not shown), if desired.

The scrubbing ionic liquid phase 140 will grow as ionic liquid is removed from the immiscible phase 130. To maintain the desired level in the vessel, recovered ionic liquid phase 150 can be removed continuously or in aliquots from the bottom or side of the scrubbing zone 135. The recovered ionic liquid phase 150 can be sent for further processing (e.g., regeneration, or the addition of a compound to generate the desired process ionic liquid) and/or recycled to the reaction zone 115. Fresh scrubbing ionic liquid or fresh ionic liquid precursor 165 can be added as needed. The height of the scrubbing zone 135 can be selected to allow sufficient residence time of the hydrocarbon droplets in order for a desired amount of ionic liquid micro-droplets to diffuse to the hydrocarbon droplet/scrubbing ionic liquid phase boundary. The residence time of the hydrocarbon droplets is governed by the acceleration through the ionic liquid phase according to the buoyancy force, after accounting for additional forces such as drag. If a practical height for the scrubbing zone is not sufficient to obtain the desired amount of ionic liquid micro-droplet recovery, multiple stages can be used in which the cleaned immiscible phase 145 is fed to one or more additional vessels (not shown). Alternatively, the immiscible phase 145 can be recycled to scrubbing zone 135. Given the selected height of the scrubbing zone 135 in this embodiment and selected residence time, the zone's cross-sectional area can be selected to accommodate the flow rate of immiscible phase 130 that is desired for the process.

Figure 3:
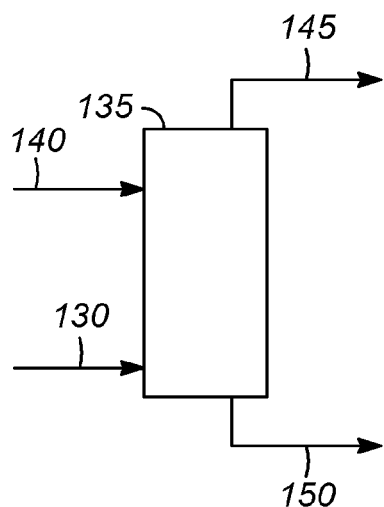
FIG. 3 illustrates another embodiment of a scrubbing zone.

Alternatively, a counter-current flow can be used in the scrubbing zone. In this arrangement, as illustrated in FIG. 3, the immiscible phase 130 containing the entrained droplets of ionic liquid enters below the point at which the scrubbing ionic liquid phase 140 enters. Typically, the immiscible phase 130 enters at or near the bottom of the vessel (e.g., within the bottom 10%), while the scrubbing ionic liquid phase 140 enters at or near the top of the vessel (e.g., within the top 10%). Because of the density difference between the immiscible phase 130 and the scrubbing ionic liquid phase 140, the ionic liquid phase 140 flows downward, and the immiscible phase 130 containing the entrained droplets of ionic liquid flows upward. The contact between the two phases results in at least a portion of the droplets of ionic liquid being transferred from the immiscible phase 130 to the scrubbing ionic liquid phase 140. The immiscible phase 145 with the lower level of entrained ionic liquid droplets is removed from the top or near the top of scrubbing zone 135. The recovered ionic liquid phase 150 is removed from the bottom or near the bottom of scrubbing zone 135 and can be sent for further processing and/or recycled to the reaction zone 115.

Figure 4:
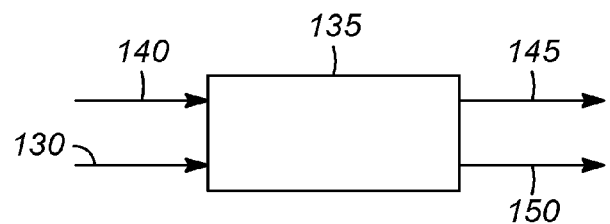
FIG. 4 illustrates still another embodiment of a scrubbing zone.

Another embodiment of the scrubbing zone 135 is illustrated in FIG. 4. The immiscible phase 130 containing the entrained droplets of ionic liquid and scrubbing ionic liquid phase 140 enter at the same end of the scrubbing zone 135 and flow co-currently. The immiscible phase 130 enters below the level where the scrubbing ionic liquid phase 140 enters. The contact between the immiscible phase 130 and the scrubbing ionic liquid phase 140 allows the transfer of at least a portion of the entrained droplets of ionic liquid from the immiscible phase 130 to the scrubbing ionic liquid phase 140. The volume of scrubbing ionic liquid in the scrubbing zone 135 should be at least the volume of the immiscible phase 130 to maximize the scrubbing of the entrained ionic liquid. The immiscible phase 145 with the lower level of droplets of ionic liquid exits the scrubbing zone 135. The recovered ionic liquid phase 150 containing the transferred portion of the droplets of ionic liquid exits the scrubbing zone 135 and can be sent for further processing and/or recycled to the reaction zone 115. Static mixers, baffles and/or other contacting devices may be installed in the scrubbing zone 135 to promote contact between the two phases.

Figure 5:
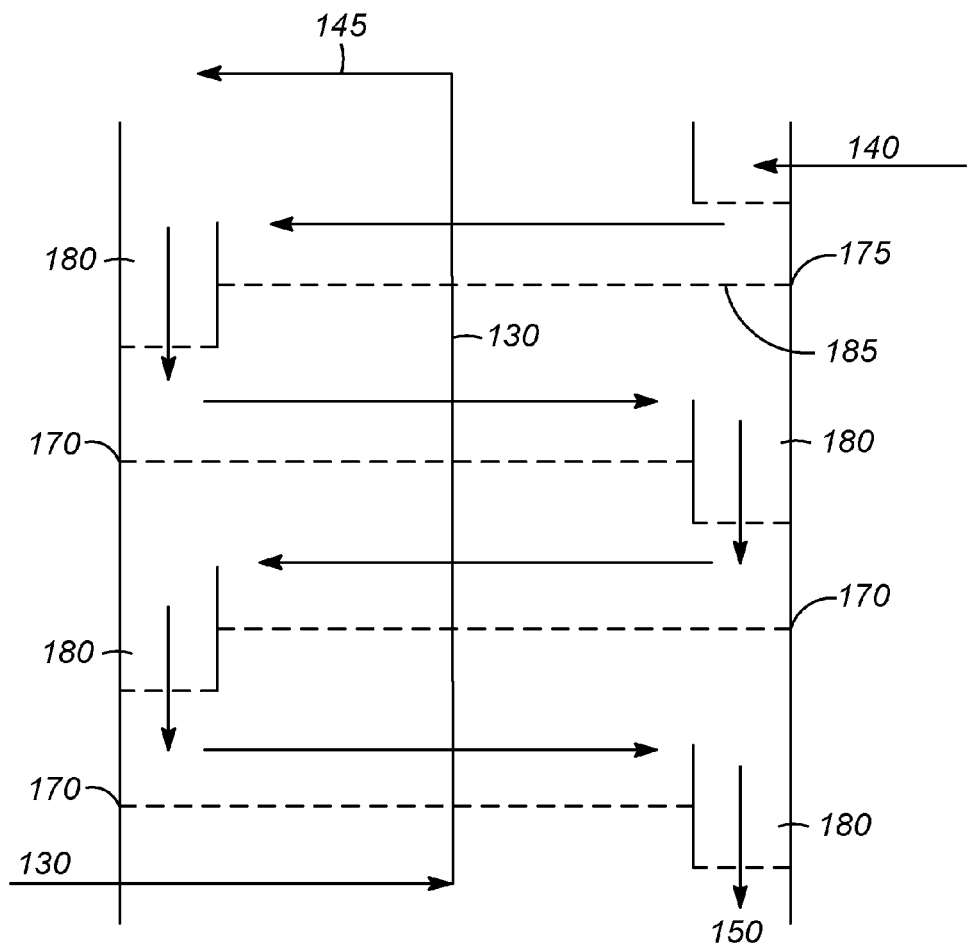
FIG. 5 illustrates one embodiment of a scrubbing zone including trays and/or distributor plates.

As illustrated in FIG. 5, the scrubbing zone 135 can include one or more trays or other mechanical devices 170 to increase the contact between the immiscible phase 130 and the scrubbing ionic liquid phase 140 and/or one or more distributor plates 175 to provide better distribution of the immiscible phase 130 and/or the scrubbing ionic liquid phase 140 as they enter the scrubbing zone. Each of the contact trays 170 can have one or more downcomers 180 and the tray floor can have perforated holes 185 or can have other dispersion devices such as valves or bubble caps. The immiscible phase 130 can pass upward through the trays vertically via the perforated holes 185 or other dispersion devices and the scrubbing ionic liquid phase 140 can flow horizontally on each of the trays and then downward through downcomer(s) 180 to the next lower tray. The open area of the perforations or dispersion devices on each of the trays can be designed such that a layer of the continuous scrubbing ionic liquid phase 140 is formed on the tray and a layer of the continuous immiscible phase 130 formed underneath each of the trays. The immiscible phase 130 can be dispersed through the layer of the scrubbing ionic liquid phase 140 on the tray and then coalesced above the dispersion zone before passing upward through dispersion devices on the next tray above. The height of the dispersion zone with immiscible phase 130 in the scrubbing ionic liquid phase 140 on each of the trays can be controlled by the height of the downcomer weir(s). The clearance between the bottom of the downcomer(s) and the tray deck below can be set to create a liquid seal, thus preventing the immiscible phase 130 from flowing upward through the downcomer(s). The recovered ionic liquid phase 150 containing the transferred portion of the droplets of ionic liquid exits the scrubbing zone 135 at the bottom and or through other tubes or perforations (not shown) and can be sent for further processing and/or recycled to the reaction zone 115.

The contacting step may be practiced in laboratory scale experiments through full scale commercial operations. The process may be operated in batch, continuous, or semi-continuous mode. The contacting step can take place in various ways, with both counter-current and co-current flow processes being suitable.

The recovered ionic liquid phase 150 from the scrubbing zone 135 contains both the scrubbing ionic liquid and the ionic liquid removed from the immiscible phase. If the scrubbing ionic liquid is chosen to be the same as the process ionic liquid, the recovered ionic liquid phase 150 can be recycled to the reaction zone 115 and used as all or a portion of the ionic liquid catalyst 110. The ionic liquid in the recovered ionic liquid phase 150 may need to be regenerated before it can be recycled.

In some embodiments, the scrubbing ionic liquid may contain deactivated or partially deactivated ionic liquid containing conjunct polymer. By deactivated or partially deactivated ionic liquid containing conjunct polymer, we mean ionic liquids that have been used in hydrocarbon conversion processes, and in which conjunct polymers have formed. By conjunct polymer, we mean the olefinic, conjugated cyclic hydrocarbons that form as a byproduct of various hydrocarbon conversion processes, including but not limited to alkylation, oligomerization, isomerization, and disproportionation.

Alternatively, the scrubbing ionic liquid could be a precursor to the process ionic liquid which is then converted into the process ionic liquid. For example, if the process ionic liquid is a heptachloroaluminate ionic liquid, the scrubbing ionic liquid could be a chloride or tetrachloroaluminate ionic liquid or a mixture thereof. The recovered ionic liquid phase, which includes a mixture of the process ionic liquid from the entrained droplets and the scrubbing ionic liquid, can then be converted to the heptachloroaluminate process ionic liquid by adding aluminum trichloride. One advantage of using precursor to the process ionic liquid as the scrubbing ionic liquid is prevention of further hydroconversion reaction in the scrubbing zone.

The scrubbing ionic liquid can be any ionic liquid. It can be composed of one or more ionic liquids. The ionic liquid comprises an organic cation and an anion. Suitable cations include, but are not limited to, nitrogen-containing cations and phosphorus-containing cations. Suitable organic cations include, but are not limited to:

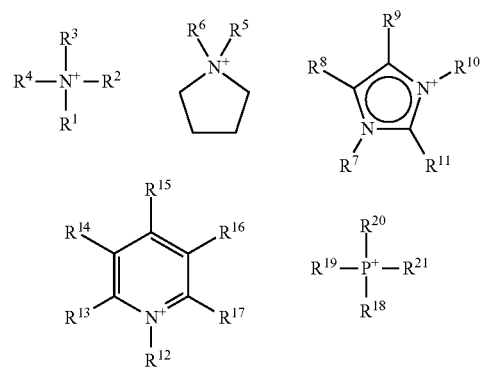

where $R^1$-$R^{21}$ are independently selected from $C_1$-$C_{20}$ hydrocarbons, $C_1$-$C_{20}$ hydrocarbon derivatives, halogens, and H. Suitable hydrocarbons and hydrocarbon derivatives include saturated and unsaturated hydrocarbons, halogen substituted and partially substituted hydrocarbons and mixtures thereof. $C_1$-$C_8$ hydrocarbons are particularly suitable.

The anion can be any anion. Examples include, but are not limited to anions derived from halides, sulfates, bisulfates, nitrates, sulfonates, fluoroalkanesulfonates, acetates, trifluoroacetates, triflates, tosylates, fluoroborates, fluorophosphates, and combinations thereof. The anion can be derived from halides, typically halometallates, and combinations thereof. The anion is typically derived from metal and nonmetal halides, such as metal and nonmetal chlorides, bromides, iodides, fluorides, or combinations thereof. Combinations of halides include, but are not limited to, mixtures of two or more metal or nonmetal halides (e.g., $AlCl_4^-$ and $BF_4^-$), and mixtures of two or more halides with a single metal or nonmetal (e.g., $AlCl_3Br^-$). In some embodiments, the metal is aluminum, with the mole fraction of aluminum ranging from 0<Al<0.25 in the anion. Suitable anions include, but are not limited to, $AlCl_4^-$, $Al_2Cl_7^-$, $Al_3Cl_{10}^-$, $AlCl_3Br^-$, $Al_2Cl_6Br^-$, $Al_3Cl_9Br^-$, $AlBr_4^-$, $Al_2Br_7^-$, $Al_3Br_{10}^-$, $GaCl_4^-$, $Ga_2Cl_7^-$, $Ga_3Cl_{10}^-$, $GaCl_3Br^-$, $Ga_2Cl_6Br^-$, $Ga_3Cl_9Br^-$, $CuCl_2^-$, $Cu_2Cl_3^-$, $Cu_3Cl_4^-$, $ZnCl_3^-$, $FeCl_3^-$, $FeCl_4^-$, $Fe_3Cl_7^-$, $PF_6^-$, and $BF_4^-$.

Example

An emulsion of tribulhexylphosphonium heptachloroaluminate (TBHP-$Al_2Cl_7$) ionic liquid with alkylate and isopentane was prepared by mixing with a cross-shaped stirbar at 1200 rpm, and then by mixing with a pipette. The emulsion was allowed to settle for one minute. The hydrocarbon-rich phase of the emulsion was analyzed by inductively charged plasma atomic emission spectroscopy (ICP-AES) for aluminum and phosphorous and found to contain 2800 ppm ionic liquid by weight. A column of TBHP-$Al_2Cl_7$ ionic liquid (15 mL in a 25 mL graduated cylinder) was used to scrub the emulsion. The emulsion was injected using a needle to the bottom of the ionic liquid column. The scrubbed isopentane phase was collected from the top of the column, and analyzed by Al and P ICP-AES. The scrubbed hydrocarbon contained 530-730 ppm ionic liquid by weight. Thus, 81-73% of the IL was removed from the emulsion, depending on whether the aluminum or phosphorous ICP data is used.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for recovering entrained ionic liquid from an ionic liquid immiscible phase containing droplets of ionic liquid comprising:
    contacting the immiscible phase containing the droplets of ionic liquid with a scrubbing ionic liquid phase in a scrubbing zone, the immiscible phase containing the droplets of ionic liquid having a first level of droplets of ionic liquid, at least a portion of the droplets of ionic liquid being transferred to the scrubbing ionic liquid phase to form a recovered ionic liquid phase comprising the scrubbing ionic liquid and the transferred portion of the droplets of ionic liquid and a second immiscible phase having a second level of droplets of ionic liquid lower than the first level; and
    separating the second immiscible phase from the recovered ionic liquid phase.

2. The method of claim 1 wherein the immiscible phase containing the droplets of ionic liquid is a hydrocarbon phase formed by contacting at least one hydrocarbon feed with an ionic liquid catalyst comprising at least one ionic liquid in a hydrocarbon conversion zone.

3. The method of claim 2 wherein the scrubbing ionic liquid in the scrubbing ionic liquid phase and the ionic liquid in the ionic liquid catalyst are the same.

4. The method of claim 2 wherein the scrubbing ionic liquid in the scrubbing ionic liquid phase is a precursor of the ionic liquid in the ionic liquid catalyst and further comprising reacting the scrubbing ionic liquid to form the ionic liquid in the ionic liquid catalyst.

5. The method of claim 1 wherein contacting the immiscible phase containing the droplets of ionic liquid with the scrubbing ionic liquid phase comprises introducing droplets of the immiscible phase containing the droplets of ionic liquid into the scrubbing zone containing the scrubbing ionic liquid phase, the droplets of the immiscible phase flowing upward through the scrubbing ionic liquid phase.

6. The method of claim 1 wherein a flow of the immiscible phase containing the droplets of ionic liquid and the scrubbing ionic liquid phase is countercurrent.

7. The method of claim 6 wherein the immiscible phase containing the droplets of ionic liquid is introduced into the scrubbing zone at or near a bottom, the scrubbing ionic liquid phase is introduced at or near a top of the scrubbing zone, and wherein the scrubbing ionic liquid phase flows downward and the immiscible phase containing the droplets of ionic liquid flows upward.

8. The method of claim 1 wherein the scrubbing zone contains at least one tray or distributor.

9. The method of claim 1 wherein a flow of the immiscible phase containing the droplets of ionic liquid and the scrubbing ionic liquid phase is co-current.

10. The method of claim 1 further comprising recycling the recovered ionic liquid phase.

11. The method of claim 1 further comprising:
    introducing the second immiscible phase into a second scrubbing zone
    contacting the second immiscible phase with a second scrubbing ionic liquid phase in the scrubbing zone, at least a portion of the droplets of ionic liquid in the second immiscible phase being transferred to the scrubbing ionic liquid phase to form a second recovered ionic liquid phase comprising the second scrubbing ionic liquid and the second transferred portion of the droplets of ionic liquid and a third immiscible phase having a third level of droplets of ionic liquid lower than the second level; and
    separating the third immiscible phase from the second recovered ionic liquid phase.

12. The method of claim 1 wherein contacting the immiscible phase containing the droplets of ionic liquid with the scrubbing ionic liquid phase takes place in the presence of a coalescing material.

13. A hydrocarbon conversion method comprising:
    contacting at least one hydrocarbon feed with an ionic liquid catalyst comprising at least one ionic liquid in a hydrocarbon conversion zone resulting in an ionic liquid phase and a hydrocarbon phase containing droplets of ionic liquid;
    separating the ionic liquid phase and the hydrocarbon phase containing the droplets of ionic liquid;
    contacting the hydrocarbon phase containing the droplets of ionic liquid with a scrubbing ionic liquid phase in a scrubbing zone, the hydrocarbon phase containing the droplets of ionic liquid having a first level of droplets of ionic liquid, at least a portion of the droplets of ionic liquid being transferred to the scrubbing ionic liquid phase to form a recovered ionic liquid phase comprising the scrubbing ionic liquid and the transferred portion of the droplets of ionic liquid and a second hydrocarbon phase having a second level of droplets of ionic liquid lower than the first level; and separating the second hydrocarbon phase from the recovered ionic liquid phase.

14. The method of claim 13 wherein the scrubbing ionic liquid in the scrubbing ionic liquid phase and the ionic liquid in the ionic liquid catalyst are the same.

15. The method of claim 13 wherein the scrubbing ionic liquid in the scrubbing ionic liquid phase is a precursor of the ionic liquid in the ionic liquid catalyst and further comprising reacting the scrubbing ionic liquid to form the ionic liquid in the ionic liquid catalyst.

16. The method of claim 13 further comprising recycling the recovered ionic liquid phase.

17. The method of claim 13 further comprising:

introducing the second hydrocarbon phase into a second scrubbing zone contacting the second hydrocarbon phase with a second scrubbing ionic liquid phase in the scrubbing zone, at least a portion of the droplets of ionic liquid in the second hydrocarbon phase being transferred to the scrubbing ionic liquid phase to form a second recovered ionic liquid phase comprising the second scrubbing ionic liquid and the second transferred portion of the droplets of ionic liquid and a third hydrocarbon phase having a third level of droplets of ionic liquid lower than the second level; and separating the third hydrocarbon phase from the second recovered ionic liquid phase.

18. The method of claim 13 wherein a flow of the immiscible phase containing the droplets of ionic liquid and the scrubbing ionic liquid phase is countercurrent or co-current.

19. The method of claim 13 wherein the hydrocarbon conversion process is selected from alkylation, disproportionation, isomerization, or combinations thereof.

20. The method of claim 13 wherein the scrubbing zone contains at least one tray or distributor.

* * * * *